(12) United States Patent
Matthews et al.

(10) Patent No.: US 11,381,529 B1
(45) Date of Patent: Jul. 5, 2022

(54) CHAT COMMUNICATION SUPPORT ASSISTANTS

(71) Applicant: Wells Fargo Bank, N.A., San Francisco, CA (US)

(72) Inventors: Kimarie Pike Matthews, Burlingame, CA (US); Richard Castanho, Rutherfordton, NC (US); Germaine S. Chee, Mill Valley, CA (US); Robin J. Cusimano, San Francisco, CA (US); Brett D. Ehrlich, San Carlos, CA (US); Tyua Larsen Fraser, Livermore, CA (US); Colleen Reardon Graham, Mooresville, NC (US); Gregory Scott Hill, Midlothian, VA (US); James W. Pedersen, Gilbert, AZ (US); Timothy J. Shipman, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 209 days.

(21) Appl. No.: 16/719,777

(22) Filed: Dec. 18, 2019

Related U.S. Application Data

(60) Provisional application No. 62/782,714, filed on Dec. 20, 2018.

(51) Int. Cl.
*H04L 51/02* (2022.01)
*G06F 3/0482* (2013.01)
(Continued)

(52) U.S. Cl.
CPC ............ *H04L 51/02* (2013.01); *G06F 3/0482* (2013.01); *G06F 3/04847* (2013.01);
(Continued)

(58) Field of Classification Search
CPC ....... H04L 51/02; H04L 51/04; G06F 3/0482; G06F 3/04847; G06F 16/437;
(Continued)

(56) References Cited

U.S. PATENT DOCUMENTS 6,907,571 B2    6/2005   Slotznick
7,085,368 B2    8/2006   Hollatz
(Continued)

FOREIGN PATENT DOCUMENTS

CN         1973292 A     5/2007
EP         1751706 A2     2/2007
(Continued)

*Primary Examiner* — Quoc A Tran
(74) *Attorney, Agent, or Firm* — Schwegman Lundberg & Woessner, P.A.

(57) ABSTRACT

Disclosed in some examples are methods, systems, and machine-readable mediums which provide for an agent support application with a plurality of plug-in communication support assistants. Each of the plurality of plug-in communication support assistants monitors communications between the agents and customers for different conversational triggers. Conversational triggers may be any conversation, either by the agent or the customer, that the communication support assistant is trained to detect. Upon detecting one of these conversational triggers, the plug-in communication support assistant provides one or more suggestions to the agent.

17 Claims, 6 Drawing Sheets

(51) Int. Cl.
*H04L 51/04* (2022.01)
*G06F 3/04847* (2022.01)
*G10L 25/63* (2013.01)
*G10L 15/22* (2006.01)
*G10L 15/18* (2013.01)
*G10L 13/00* (2006.01)
*G06N 20/00* (2019.01)
*G06F 16/9535* (2019.01)
*G06F 16/435* (2019.01)
*G06F 17/00* (2019.01)

(52) U.S. Cl.
CPC ............ *H04L 51/04* (2013.01); *G06F 16/437* (2019.01); *G06F 16/9535* (2019.01); *G06N 20/00* (2019.01); *G10L 13/00* (2013.01); *G10L 15/1815* (2013.01); *G10L 15/22* (2013.01); *G10L 25/63* (2013.01)

(58) Field of Classification Search
CPC ..... G06F 16/9535; G10L 13/00; G10L 25/63; G10L 15/1815; G10L 15/22; G06N 20/00
See application file for complete search history.

(56) References Cited

U.S. PATENT DOCUMENTS

| | | |
|---|---|---|
| 7,215,757 B2 | 5/2007 | Pennington, Jr. et al. |
| 7,231,033 B2 | 6/2007 | Stuart et al. |
| 7,983,411 B2 | 7/2011 | Huet et al. |
| 8,019,646 B2 | 9/2011 | Lewis-hawkins |
| 8,073,130 B2 | 12/2011 | Dezonno |
| 8,135,126 B2 | 3/2012 | Shafiee et al. |
| 8,275,117 B2 | 9/2012 | Huet et al. |
| 9,008,283 B2 | 4/2015 | Riahi et al. |
| 9,083,561 B2 | 7/2015 | Griesmer et al. |
| 9,083,801 B2 | 7/2015 | Conway et al. |
| 9,112,971 B2 | 8/2015 | Munns et al. |
| 9,124,697 B2 | 9/2015 | Scott et al. |
| 9,154,626 B2 | 10/2015 | Uba et al. |
| 9,185,222 B1 | 11/2015 | Govindarajan et al. |
| 9,549,065 B1 | 1/2017 | Naik et al. |
| 9,559,993 B2 | 1/2017 | Palakovich et al. |
| 9,584,990 B1 | 2/2017 | Boutcher et al. |
| 9,652,793 B2 | 5/2017 | Sri et al. |
| 9,712,465 B2 | 7/2017 | Blecon et al. |
| 9,805,371 B1 | 10/2017 | Sapoznik et al. |
| 9,807,037 B1 | 10/2017 | Sapoznik et al. |
| 9,866,693 B2 | 1/2018 | Tamblyn et al. |
| 9,894,207 B2 | 2/2018 | Sri et al. |
| 9,912,810 B2 | 3/2018 | Segre et al. |
| 9,973,457 B2 | 5/2018 | Cauchois et al. |
| 10,003,692 B2 | 6/2018 | Skiba et al. |
| 10,038,784 B2 | 7/2018 | Odinak et al. |
| 10,038,787 B2 | 7/2018 | Tamblyn |
| 10,051,123 B2 | 8/2018 | Griesmer et al. |
| 10,079,937 B2 | 9/2018 | Nowak et al. |
| 2002/0087385 A1 | 7/2002 | Vincent |
| 2003/0179876 A1 | 9/2003 | Fox et al. |
| 2005/0193055 A1 | 9/2005 | Angel et al. |
| 2005/0213743 A1 | 9/2005 | Huet et al. |
| 2007/0206757 A1 | 9/2007 | Pennington et al. |
| 2009/0245500 A1 | 10/2009 | Wampler |
| 2011/0235797 A1 | 9/2011 | Huet et al. |
| 2014/0270146 A1* | 9/2014 | Riahi .................. H04M 3/4936 379/265.13 |
| 2015/0103995 A1 | 4/2015 | Mccormack et al. |
| 2015/0181039 A1 | 6/2015 | Erhart et al. |
| 2015/0304492 A1 | 10/2015 | Eyeson |
| 2016/0295018 A1 | 10/2016 | Loftus et al. |
| 2016/0308799 A1 | 10/2016 | Schubert et al. |
| 2017/0339274 A1 | 11/2017 | Odinak et al. |
| 2018/0054523 A1 | 2/2018 | Zhang et al. |
| 2018/0253734 A1 | 9/2018 | Henry |
| 2018/0278750 A1* | 9/2018 | Avila ...................... H04L 51/02 |
| 2020/0143386 A1* | 5/2020 | Tomlinson ........... G06Q 30/016 |

FOREIGN PATENT DOCUMENTS

| | | |
|---|---|---|
| JP | 2007532989 A | 11/2007 |
| JP | 4853670 B2 | 11/2011 |
| WO | WO-2005098722 A2 | 10/2005 |

* cited by examiner

110

DAVID GARCIA TO AMY CONNOR
FEB. 14, 2018 at 10:34 A.M.
I'LL JUST NEED SOME MORE INFORMATION ABOUT BOTH APPLICANTS

120

BOTH APPLICANTS IS TOO IMPERSONAL. CONSIDER REPLACING WITH: "YOU AND YOUR SPOUSE"

[ ACCEPT ]  [ DECLINE ]

122 — MAKE A SUGGESTION — 124

— 126

130

DAVID GARCIA TO AMY CONNOR
FEB. 14, 2018 at 10:34 A.M.
I'LL JUST NEED SOME MORE INFORMATION ABOUT YOU AND YOUR SPOUSE

CHAT COMMUNICATION SUPPORT ASSISTANTS

PRIORITY CLAIM

This patent application claims the benefit of priority, under 35 U.S.C. Section 119 to U.S. Provisional Patent Application Ser. No. 62/782,714, entitled "CHAT COMMUNICATION SUPPORT ASSISTANTS," filed on Dec. 20, 2018, which is hereby incorporated by reference herein in its entirety.

BACKGROUND

The explosion of network-based computing brought about by the Internet has led to an increase in the modes of communication available for communication between people. As additional modes of communication have become more popular, companies have responded by utilizing these modes of communication to assist users. For example, in addition to telephonic communications, companies now assist users using text-based chat sessions with live agents or with artificial intelligence-based chat communication support assistants, video sessions, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
FIG. 1 illustrates a portion of a user interface of a customer service application including the agent support application according to some examples of the present disclosure.
Figure 1:
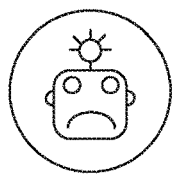
Figure 1:

Live customer service agents utilizing instant messaging and other communication modes with customers may benefit from coaching. For example, a particular agent may be inexperienced and have trouble properly interacting with customers. It may be beneficial for the agent to work on certain skills. For example, the agent may have undesired habits, such as using language that is too impersonal, or they may have difficulty conveying empathy. Other agents may need help with spelling or grammar. Still other agents may need help with certain products and/or features, upselling, or the like. Traditional systems utilized supervisors or other agents that monitor the agents' communications and make suggestions. This solution is not ideal as the quality of help varies considerably amongst supervisors and other agents. Moreover, this solution is labor intensive as the supervisor cannot be monitoring the agent all the time. This makes detecting problems and fixing them dependent on when the agent is being monitored.

In order to provide this assistance without the drawbacks of human coaching, a software application may continuously monitor the agent's communications with customers and provide suggested help automatically when indicated. The support algorithm may utilize one or more natural language processing algorithms utilizing one or more machine-learned models. Features of the agent's communications may be input to the natural language processing algorithms. Features of the communication including the content of the communications, content of previous communications, information about the customer, content from customer satisfaction surveys for that agent, agent-level production data or other information about the agent. The model may determine whether assistance is necessary and what assistance to provide. The models may be machine-learned using training data that comprise historical feature data that is labelled with an indication of whether assistance is appropriate given the historical feature data and one or more indications of the appropriate assistance.

As can be appreciated, different support agents may need different assistance. A one-size fits all model that detects all possible assistance to provide may be undesirable as it may present suggestions that are unhelpful to an agent working on specific communication skills. An agent may wish to hone his or her skills with respect to specific topics. In such a situation, having a support application that suggests all possible corrections may overwhelm the user. A more targeted approach that allows the agent to focus on topics where the agent needs help is desirable. A one-size fits all model may also be too slow to be executed on a single computing device and may not be fast enough to be used in real-time communications. Furthermore, the one-size fits all model may not adapt well to new concepts. For example, if a new product is introduced, the company may wish to have the support application assist customer service agents in discussing the new product. In order to do this, new training data needs to be created and the model will have to be retrained. Models employing a one-size fits all approach may have a large training data set and for certain models, a large amount of new training data directed to the new product may be needed. This may become burdensome for administrators of the system.

Disclosed in some examples are methods, systems, and machine-readable mediums which provide for an agent support application with a plurality of plug-in communication support assistants. Each of the plurality of plug-in communication support assistants is a computer algorithm that automatically monitors communications between the agents and customers for different conversational triggers. Conversational triggers may be any communication, either by the agent or the customer, that the communication support assistant is trained to detect. In some examples, the conversational triggers may be agent training topics that are particular communication deficiencies of the agent. Example conversational triggers may include agent communications that use language that is too formal, does not show empathy, spelling errors, grammar errors, agent communications that use language that is not respectful, language indicating upselling opportunities, and the like. Upon detecting one of these conversational triggers, the plug-in communication support assistant provides one or more suggestions to the agent. Examples include edits to the communication that makes the communication conform to the appropriate level of formality, provide the appropriate level of respect, and the like.

The agent support application comprises an assistance framework with a discriminator model that utilizes historical conversations between live agents and customers to determine whether activation of specific and tailored communication support assistants within the assistance framework is indicated. For example, if the discriminator detects more than a threshold number of instances of a particular conversational trigger over a particular determined amount of time or communication volume, the discriminator may suggest activating a communication support assistant to assist the agent with overcoming that conversational trigger. Communication support assistants may be specialized natural language processors that are trained to monitor the agent's communications, detect specific conversational triggers in a conversation with high accuracy, and suggest actions based upon those triggers. In contrast, the discriminator may be a more general model that may be executed offline using saved feature data and may not be as accurate at detecting particular triggers as the communication support assistants.

Figure 2:
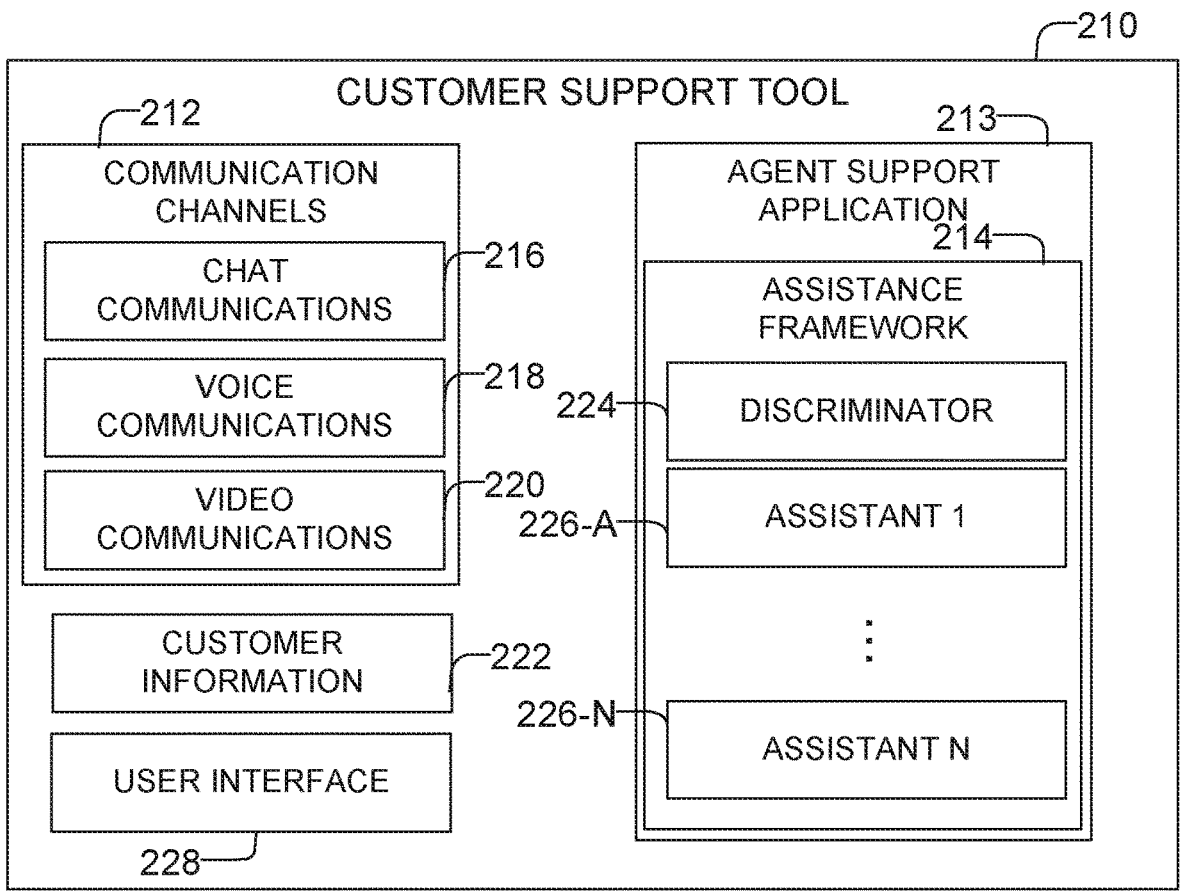
FIG. 2 illustrates a customer support tool that may be utilized by a customer support agent to provide customer support over a plurality of communication channels according to some examples of the present disclosure.

Activation of a communication support assistant may include downloading and installing the communication support assistant on the computing device executing a customer support tool (e.g., customer support tool 210 discussed with respect to FIG. 2). The customer support assistants may thus be thought of as a "plug-in," "add-in," or "extension" module. In some examples, activating may also include providing access to the communications of the agent to the communication support assistants. In some examples, by downloading the communication support assistants only when necessary, storage space on the agent's computing device may be conserved as opposed to large, one-size-fits-all models.

The communication support assistant may monitor conversational triggers in both agent communications to the customer but also customer communications to the agent. For example, one communication support assistant may monitor conversational triggers related to whether the live agent is being too formal with a customer. If the communication support assistant detects that the live agent is being too formal, the communication support assistant may suggest better language that is less formal. Another example communication support assistant may assist the live agent in upsell opportunities by monitoring the conversation and providing upsell language to the live agent. The communication support assistants may be activated manually by the agent from a list provided by the framework, may be suggested by the discriminator, or may be automatically activated by the discriminator. A conversational trigger may be a condition related to the content and meaning of the conversation. Examples include triggers related to use of impersonal language, triggers related to informal language, triggers related to disrespectful language, triggers related to upselling of products, triggers related to products that indicate that the agent is not familiar with the product, and the like.

Actions suggested by the communication support assistant may be displayed in a graphical user interface (GUI) which may be selected by the live agent. These actions may include changes to the agent's communication such as updating a message that the agent was typing, or was about to send, to the customer. The agent may make the suggested changes by clicking on a GUI element, such as a button. Thus, the agent, in one click, can take the recommended action. In addition to actions that change or enhance the content delivered to the customer, other actions include bringing an additional agent into the conversation. For example, if the agent is trying to upsell a product or cross-sell, an agent specializing in those areas may be brought into the conversation.

Each communication support assistant may monitor the number of times that it provides a recommended action. If the communication support assistant determines that it has provided fewer recommended actions than a predetermined threshold over a certain time period (e.g., a certain number of weeks, months; a certain volume of communications; and the like) the communication support assistant may recommend the agent deactivate it or it may recognize the agent for improvement through an award or badge. The live agent may also provide feedback to the communication support assistant to make the suggestions of the communication support assistant better.

The use of disparate communication support assistants for different conversational triggers provides technical advantages over a single semantic processor that is trained to detect all conversational triggers. As noted, the use of tailored analysis of the live agent's communications will be more useful to the agent in that it will not overwhelm the agent with suggestions that are not as relevant. Furthermore, a specialized semantic processor trained to detect a specific conversational trigger will be more reliable and accurate than a semantic processor trained for multiple triggers. In addition, fewer computing resources are necessary to execute one or more specialized semantic processors (communication support assistants) than a general semantic processor. Additionally, using a discriminator to activate, or suggest activation, of one or more specialized semantic processors allows for the addition of additional triggers without substantial model retraining. Moreover, the discriminator can be run off-line and so the discriminator can use models that are more accurate as they do not have to produce immediate results.

FIG. 1 illustrates a portion of a user interface 100 of a customer service application including the agent support application. The agent support application in FIG. 1 has a communication support assistant activated that monitors for a conversational trigger of language to customers that is too impersonal. In card 110, the agent—David Garcia—is typing a message to Amy Connor—the customer. The agent starts typing "I'll just need some more information about both applicants." The communication support assistant monitors the communication and detects that the language of the communication is too impersonal. The communication support assistant may highlight the offending language in the communication (as shown in FIG. 1 by underlining and bolding the offending language). In card 120, the communication support assistant may provide a message (e.g., a pop-up dialog) to the agent that the language is impersonal and provide a suggestion including one or more replacement communication portions. The agent may be provided one or more controls, such as buttons 122 and 124 for accepting or declining the suggestion. If the suggestion is accepted, as shown in card 130, the agent's communication is automatically updated with the replacement communication portions. A link may be provided 126 to provide feedback to the communication support assistant. For example, to indicate that the action provided is not helpful.

Turning now to FIG. 2, a customer support tool 210 may be utilized by a customer support agent to provide customer support over a plurality of communication channels 212.

Components shown in FIG. 2 are exemplary and it will be appreciated by a person of ordinary skill in the art with the benefit of this disclosure that more or less components than are shown may be utilized. Additionally, components may be organized, and their functionality distributed in different ways than shown in FIG. 2. Customer support tool 210 may provide one or more communication channels, such as chat communications channel 216, voice communications channel 218, video communications channel 220, and other channels. Each communication channel 212 may include software and/or hardware for causing the customer support tool 210 to support the indicated communication channel. For example, voice communications channel 218 may include software for encoding and decoding voice, one or more network protocols that allow for setting up calls and transmitting and receiving voice using Voice over Internet Protocol (VoIP) communications, and the like. Some network hardware may be shared across communication channels (e.g., a network interface card may be shared amongst the channels, various protocol layers may be shared, and the like). Video communications channel 220 may include one or more encoding algorithms for encoding audio and video and one or more networking protocols to stream the video. Chat communications channel 216 may include one or more software protocols for transmitting messages.

User interface 228 may provide one or more user interfaces for utilizing the customer support tool 210, including using one or more of the communication channels 212. For example, a chat interface (e.g., displays controls to allow typing and sending messages), a voice communications interface (e.g., a dialer), and a video communications interface (e.g., a dialer and a window to display video). User interface 228 may also display one or more windows with customer information from customer information retrieval module 222. User interface 228 may provide one or more action suggestions from one or more communication support assistants from assistance framework 214 of agent support application 213. For example, the user interface 228 may provide the user interface as shown in FIG. 1. User interface 228 may also provide messages from the discriminator and allow users to select, add, and remove communication support assistants.

Agent support application 213 may include an assistance framework with a discriminator 224. Discriminator may analyze one or more past communications by an agent to a one or more customers using a machine learning model. In the case of voice or video communications, the customer support tool 210 may transcribe these communications prior to analysis. The discriminator provides one or more suggestions to the live agent through the user interface 228 to enable or disable one or more communication support assistants. A plurality of communication support assistants, labeled in FIG. 2 as communication support assistants 226-A . . . 226-N may employ semantic processors trained to recognize a specific conversational trigger condition in one or more communications and determine a corrective action. The communication support assistants may monitor chat communications on chat communications channel 216, voice communications on voice communications channel 218, video communications on video communications channel 220, and the like. In FIG. 2, the assistance framework 214 is shown as being local to the agent's computing device by way of being included in the customer support tool. In other examples, the disclosed functionality of the assistance framework may be performed by a network-based service and the assistance framework 214 may be an interface to that network-based service.

Communication support assistants may be specific to each channel. That is, past chat communications may be utilized to recommend customer support assistants specific to a chat channel and past voice communications may be utilized to recommend customer support assistants specific to a voice communications channel. These customer support assistants only monitor their assigned channel and may provide suggested actions specific to those channels. In other examples, the communication support assistants monitor all channels and are recommended by the discriminator 224 on the basis of communications across all channels. Thus, a particular conversational trigger detected in a voice communications channel 218 may cause a communication support assistant detecting and providing action suggestions for the particular conversational trigger in chat communications channel 216, voice communications channel 218, and video communications channel 220.

The corrective action may be displayed in the user interface 228—either on screen, played via a text to speech synthesizer as an audio output of the agent's computer, or the like. The corrective actions may include one or more selectable GUI or voice controls. One of the selectable controls may automatically update a textual message in a chat communication with text indicated by the corrective action. For voice or video, a speech-to-text processor may read the suggestion to the customer in an agent's voice to sound like the agent. Since voice and video may have corrections to words already spoken, the action may include phrases correcting earlier speech. For example, "I'm sorry I meant . . . ." In some examples, a plurality of corrective actions may be generated, and the user interface may include selection controls for selecting which of the corrective actions (if any) to apply.

Figure 3:
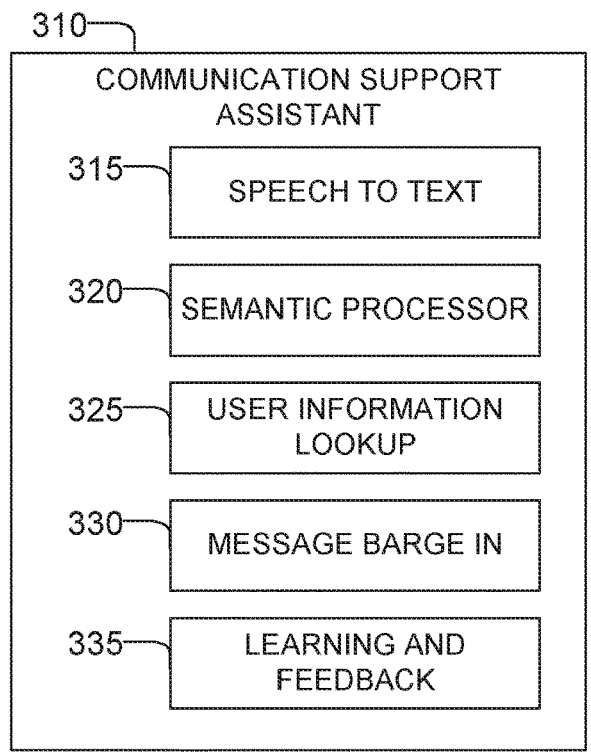
FIG. 3 illustrates a logical diagram of a communication support assistant according to some examples of the present disclosure.

FIG. 3 shows a logical diagram of a communication support assistant 310 according to some examples of the present disclosure. The communication support assistant 310 may be an example of one or more of communication support assistants 226-A-226-N. Communication support assistant 310 may include a speech to text processor 315 that may transcribe spoken text (e.g., from verbal channels such as voice communications channel 218, and audio from the video communications channel 220). Speech to text processor 315 may utilize one or more methods, such as Hidden Markov Models, Dynamic Time Warping (DTW), neural networks, and the like.

Figure 4:
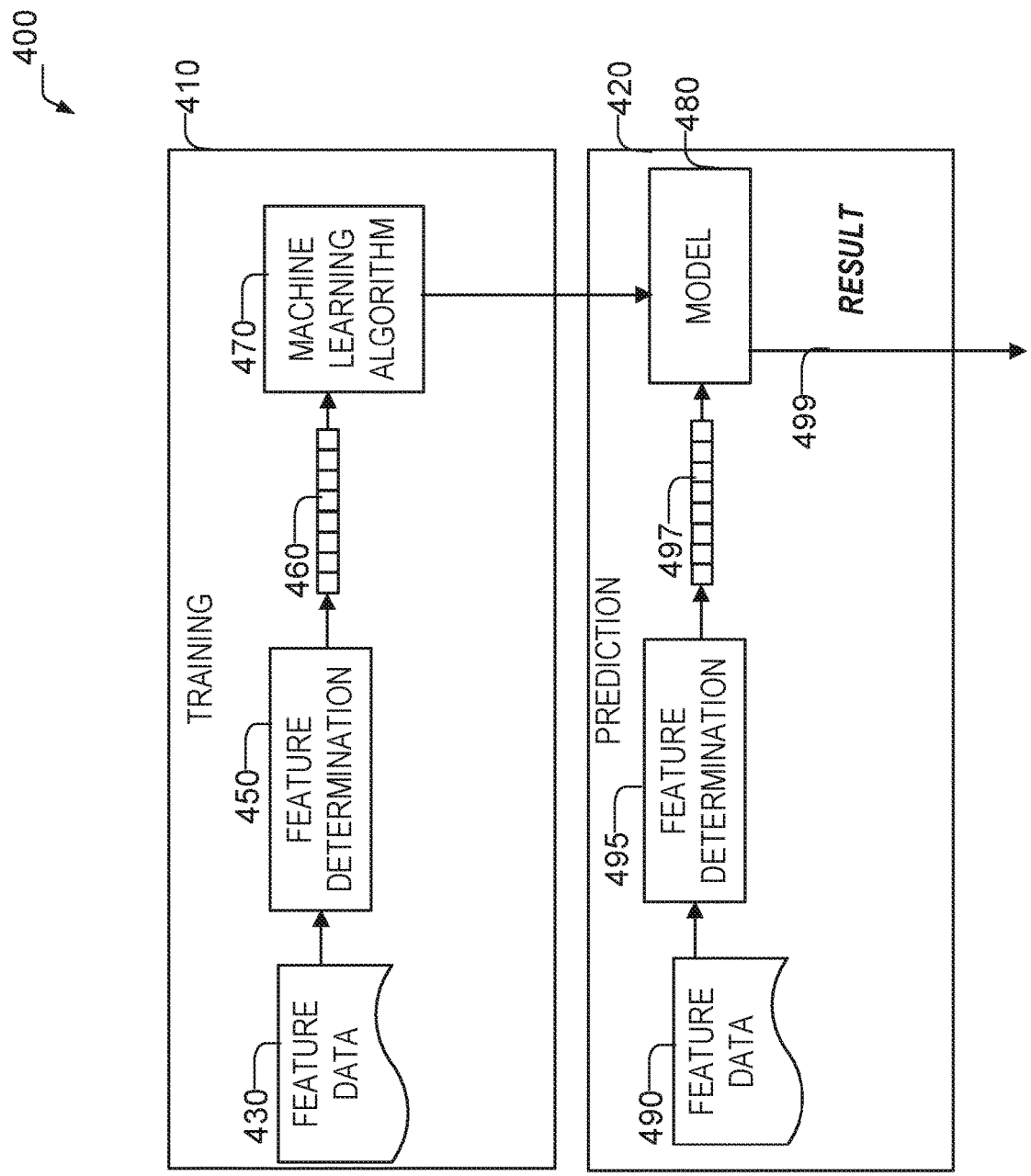
FIG. 4 illustrates an example machine learning module according to some examples of the present disclosure.

Communication support assistant 310 may include a semantic processor 320. Semantic processor 320 may take written text (either directly from a text-based channel or from the speech to text processor 315) and determine whether one or more target conversational conditions are present. The semantic processor 320 may be a machine-learned model that is trained to detect the one or more target conversational conditions using training data. The training data may be previous conversational communications and be labeled with an indication as to whether it has the one or more target conditions. The machine learning algorithms used to train the model may include a neural network, natural language processing algorithms, decision tree algorithms, decision forest algorithms, and the like. FIG. 4 shows additional details of the machine learning aspects.

In addition to the text of the conversation, other inputs to the semantic processor 320 may include user information details (e.g., demographic information, account information, social networking information, and the like), for video channels—a detected emotion of the user, information about the agent (e.g., demographic information, account information, social networking information, and the like), and the like. For example, user information lookup 325 may determine one or more user information features for use by the semantic processor 320.

User information lookup 325 may query one or more databases for information about the customer and/or the agent. This may include querying one or more sources for account information, demographic information, social networking information, and the like.

Message barge-in component 330 may interface with one or more of the communication channels and/or the user interface 228 to update one or more draft messages authored by the agent consistent with one or more accepted corrective actions or to provide video or audio messages for those channels. For example, a portion of the message may be replaced with different text determined by the semantic processor 320. In other examples, for video and/or audio channels the barge-in component may play a message using a voice-to-text processor. The message may be played in a voice that is modelled after the agent to have the user think it came from the agent.

In some examples, the semantic processor 320 may detect a particular conversational trigger (e.g., language which is too formal) and provide one or more suggestive corrective actions, but in other examples a different component may provide one or more suggestive corrective actions (e.g., using a different machine-learned model). For example, one machine learning model may detect the conversational trigger and another model may provide one or more actions.

Learning and feedback component 335 may update the model of the semantic processor 320 based upon explicit and/or implicit feedback. For example, if the agent selects an action recommended by the semantic processor 320, the learning and feedback component 335 may save the features (e.g., the communications, customer information, etc.) used to derive that action recommendation as training data and label that data as having triggered on a desired conversational trigger and with an appropriate recommendation. The data may then be used to refine the model of the semantic processor 320 by retraining the model with the additional data. For a neural network, for example, this additional training data may reinforce or increase the weights of the neurons of the model. In some examples, negative feedback may also be incorporated. For example, if the user does not select the action, the features used to derive that action recommendation may be saved as training data labelled as having not triggered on the desired detection condition or as producing an improper recommendation. The system may differentiate between whether the action recommendation did not trigger appropriately (e.g., the condition was not present) or whether the action recommendation was not appropriate (e.g., the condition was present, but the suggestion was not helpful) using user feedback. For example, if the user declines the action suggestion, the system may prompt the user as to why.

Likewise, the user interface may allow users to submit explicit feedback. For example, by selecting a link (as shown in FIG. 1) that tells the semantic processor 320 whether the suggestion was helpful or not. In a same way as described for the implicit feedback, the explicit feedback may be used to retrain the model. As in FIG. 2, the components and organization of the communication support assistant 310 is exemplary and other configurations and components may be utilized.

As described previously, the system may utilize one or more semantic processors which may utilize one or more machine-learned models to parse language, determine a meaning, determine whether a conversational trigger condition is met and if the trigger condition is met, determine an appropriate action, and the like. Additionally, as described, the discriminator may use one or more machine learned models to determine (either offline or online) whether activation of one or more communication support assistants is indicated. FIG. 4 illustrates an example machine learning module 400 according to some examples of the present disclosure. Prediction module 420 and/or training module 410 may be part of the semantic processor 320 and/or discriminator 224. Machine learning module 400 may utilize a training module 410 and a prediction module 420. Training module 410 feeds feature data 430 into feature determination module 450. For communication support assistants (e.g., semantic processor 320) the feature data 430 includes text of present and/or past communications between the agent and the customer, customer information, agent information, and the like. In some examples, the features may be explicitly labeled with whether or not the features describe the trigger condition that the communication support assistant is to be used to detect and/or appropriate actions to take upon detection of the trigger condition. For the discriminator, the features may be labelled with one or more recommended communication support assistants.

Feature determination module 450 determines one or more features for feature vector 460 from this information. For communication support assistants, features of the feature vector 460 are a set of the information input determined to be predictive of whether or not the conversation includes a conversational trigger and/or what correction to recommend. For the discriminator, the features of the feature vector 460 are a set of information input determined to be predictive of which communication support assistant should be recommended (e.g., which triggering conditions that are handled by the communication support assistants are present in the user's communications). Features may be all the feature data 430 or in some examples, may be a subset of all the feature data 430. Thus, part of training the machine learning model 480 may be determining an importance of the feature data 430 to predicting relevant candidates. In examples in which the features are a subset of the feature data 430, a predetermined list of which feature data 430 is included as a feature in the feature vector 460 may be utilized. The feature vector 460 may be utilized (along with any applicable labels) by the machine learning algorithm 470 to produce a machine learning model 480.

In the prediction module 420, the feature data of the current or recent communications and/or current customer information and current agent information 490 may be input to the feature determination module 495. Feature determination module 495 may determine the same set of features or a different set of features as feature determination module 450. In some examples, feature determination modules 450 and 495 are the same module. Feature determination module 495 produces feature vector 497, which are input into the machine learning model 480 to generate a result 499. The result may be an indication as to whether a triggering condition has been detected and/or an indication of a corrective action. In examples in which the model is for the discriminator, the result may be whether or not one or more communication support assistants should be activated (e.g., based upon detected triggers in the agent's communications).

The training module 410 may operate in an offline manner to train the machine learning model 480. The prediction module 420, however, may be designed to operate in an online manner. It should be noted that the machine learning model 480 may be periodically updated via additional training and/or user feedback. The machine learning algorithm 470 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Intercommand Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and the like. Unsupervised models may not have a training module 410.

Figure 5:
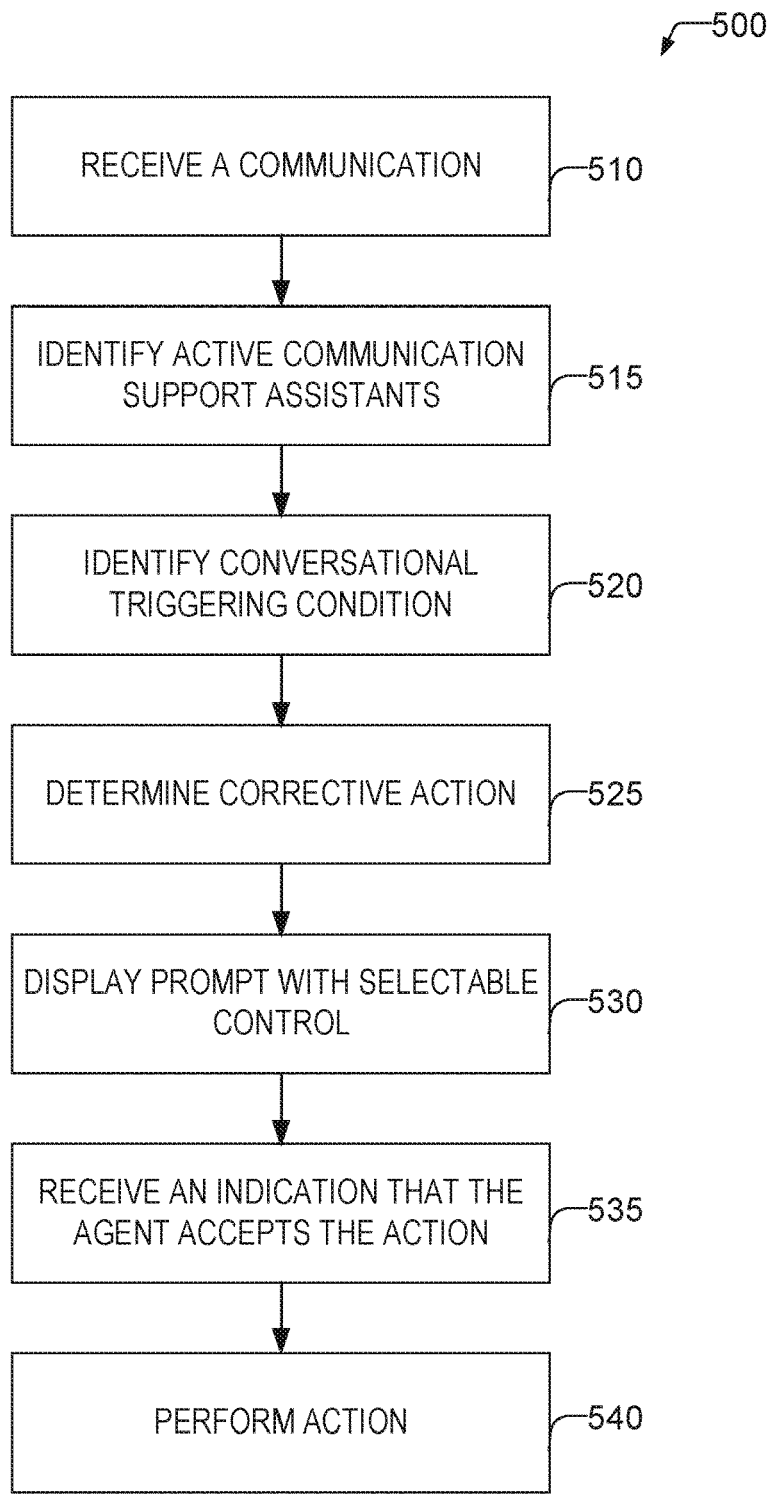
FIG. 5 illustrates a flowchart of a method for providing suggestions to a communication agent according to some examples of the present disclosure.

FIG. 5 illustrates a flowchart of a method 500 for providing suggestions to a communication agent according to some examples of the present disclosure. At operation 510 the assistance framework may receive a new communication. The assistance framework may store the received communications along with other received communications related to the conversation so as to analyze the entire conversation. In other examples, the assistance framework may only analyze single messages. The communication may be voice, video, text. The communication may be sent by the customer or the agent.

At operation 515 the assistance framework may identify the list of active communication support assistants. For example, when becoming active, a communication support assistant may subscribe to a communication event and provide a callback function. The assistance framework may invoke these callbacks (either sequentially or in parallel). At operation 520, one or more of the communication support assistants may identify a conversational triggering condition. For example, the communication support assistant may submit the communication received at operation 510, one or more communications (e.g., other communications in the conversation), customer information, agent information, and the like to a machine-learned model. At operation 525 the communication support assistant may determine a corrective action. As already noted the model that detects the triggering condition at operation 520 may also determine the corrective action, or a different model may be utilized.

At operation 530 the communication support assistant may display a prompt with a selectable control. At operation 535, the communication support assistant may receive an indication that the agent accepts the action. At operation 540, the system may perform the action. Example actions include replacing text in a chat communication, playing a text-to-voice message, or the like.

Figure 6:
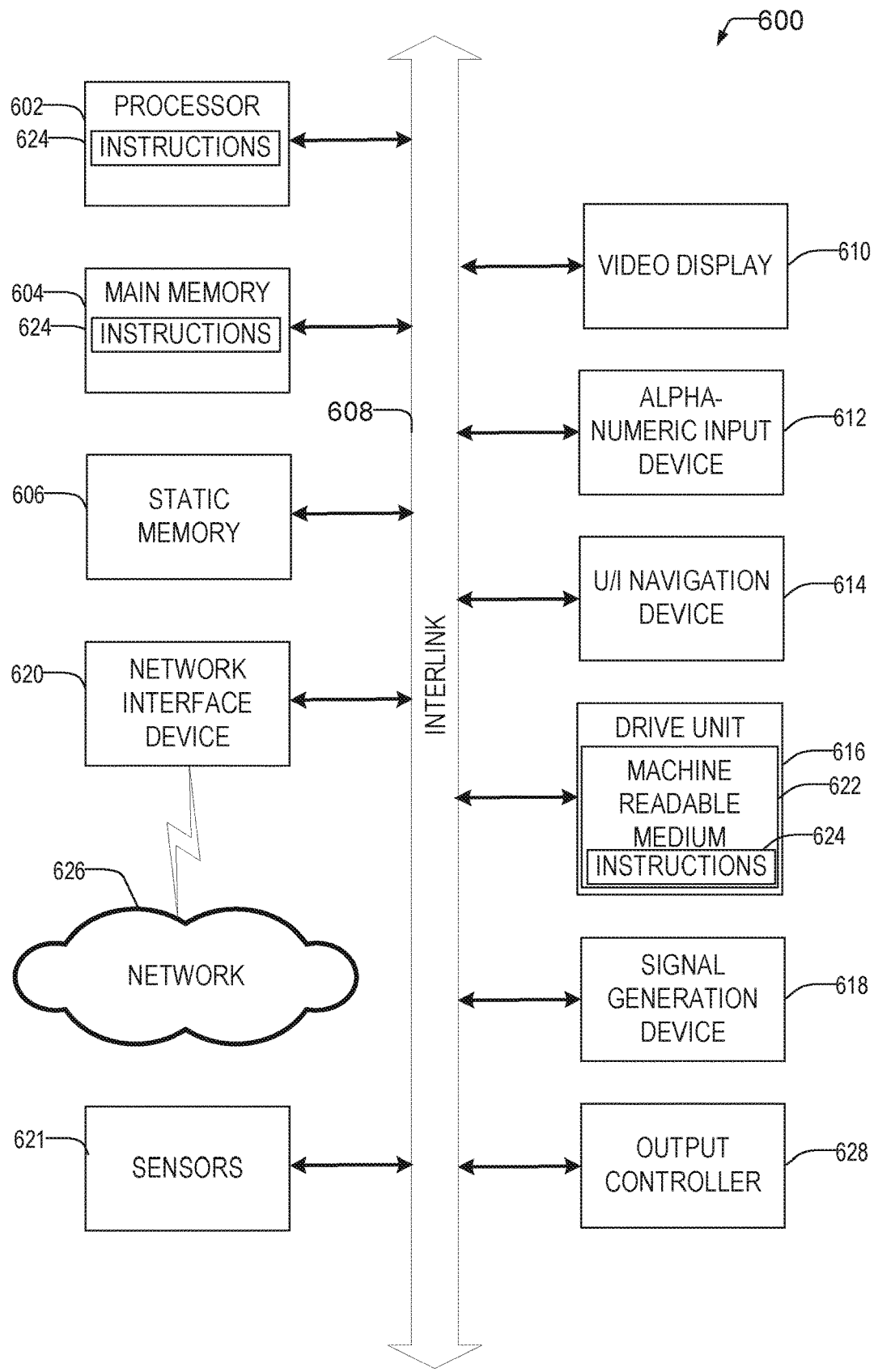
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or communication support assistanth in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 600 may render the user interface of FIG. 1, be configured to implement the components of FIGS. 2-4 and implement the method of FIG. 5. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media. that is not a transitory propagating signal.

The instructions 624 may further be transmitted or received over a communications network 626 using a transmission medium via the network interface device 620. The Machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g.; Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

OTHER NOTES AND EXAMPLES

Example 1 is a computer-implemented communication support method, the method comprising: receiving a communication from a first communication participant and to a second communication participant prior to a transmission of the communication to the second communication participant; identifying a plurality of activated communication support assistants that are activated for the first communication participant, the plurality of activated communication support assistants selected from a plurality of available communication support assistants; identifying, using at least one of the plurality of activated communication support assistants, that a conversational triggering condition is present in the communication, each one of the plurality of available communication support assistants trained to detect a different conversational triggering condition; determining, using the at least one of the plurality of activated communication support assistants, at least one corrective action, the corrective action including a change to a content of the communication; causing a graphical user interface to be displayed to the first communication participant, the graphical user interface including a selectable control; receiving an indication that the selectable control has been selected by the first communication participant; responsive to receiving the indication that the selectable control has been selected, modifying the communication in accordance with the corrective action; and transmitting the communication to the second communication participant.

In Example 2, the subject matter of Example 1 includes, wherein the method further comprises: analyzing a plurality of past communications between the first communication participant and other second communication participants; determining that a second conversational triggering condition occurs in the plurality of past communications at a rate that is above a threshold, wherein the second conversational triggering condition is specific to an inactive communication support assistant of the plurality of available communication support assistants; and providing a suggestion, in a graphical user interface, that the first communication participant activate the inactive communication support assistant.

In Example 3, the subject matter of Example 2 includes, wherein the determining that the second conversational triggering condition occurs in the plurality of past communications comprises determining, via a machine-learned discriminator model, that the second conversational triggering condition specific to an inactive communication support assistant of the plurality of available communication support assistants occurs in the plurality of past communications at the rate that is above the threshold.

In Example 4, the subject matter of Example 3 includes, receiving an indication that a new communication support assistant is available, the new communication support assistant trained to detect a third conversational triggering condition; identifying training data comprising second plurality of past communications labeled with indications of whether the third conversational triggering condition detected by the new communication support assistant is present in the second plurality of past communications; updating the machine-learned discriminator model using the identified training data; analyzing a third plurality of past communications between the first communication participant and other second communication participants; determining that the third conversational triggering condition is detected by the new communication support assistant occurs in the third plurality of past communications at a rate that is above a second threshold; and providing a second suggestion, in a second graphical user interface, that the first communication participant activate the new communication support assistant.

In Example 5, the subject matter of Examples 2-4 includes, receiving an indication that the first communication participant wishes to activate the inactive communication support assistant; and responsive to receiving the indication, installing the inactive communication support assistant.

In Example 6, the subject matter of Examples 1-5 includes, receiving a second communication from a second communication participant to the first communication participant; identifying the plurality of activated communication support assistants that are activated for the first communication participant; identifying, using a second one of the plurality of activated communication support assistants, that a second triggering condition is present in the second. communication; determining, using the at least one of the plurality of activated communication support assistants, at least one corrective action, the corrective action including a referral to another agent; causing a graphical user interface to be displayed to the first communication participant, the graphical user interface including a selectable control; receiving an indication that the selectable control has been selected by the first communication participant; and responsive to receiving the indication that the selectable control has been selected, connecting the another agent into a communication conversation between the first communication participant and the second communication participant.

In Example 7, the subject matter of Example 6 includes, wherein the second triggering condition is an upsale opportunity.

In Example 8, the subject matter of Examples 1-7 includes, wherein the conversational triggering condition is language that is too formal.

Example 9 is a computing device comprising: a processor; a memory, comprising instructions, which when executed by the processor, cause the processor to perform operations comprising: receiving a communication from a first communication participant and to a second communication participant prior to a transmission of the communication to the second communication participant; identifying a plurality of activated communication support assistants that are activated for the first communication participant, the plurality of activated communication support assistants selected from a plurality of available communication support assistants; identifying, using at least one of the plurality of activated communication support assistants, that a conversational triggering condition is present in the communication, each one of the plurality of available communication support assistants trained to detect a different conversational triggering condition; determining, using the at least one of the plurality of activated communication support assistants, at least one corrective action, the corrective action including a change to a content of the communication; causing a graphical user interface to be displayed to the first communication participant, the graphical user interface including a selectable control; receiving an indication that the selectable control has been selected by the first communication participant; responsive to receiving the indication that the selectable control has been selected, modifying the communication in accordance with the corrective action; and transmitting the communication to the second communication participant.

In Example 10, the subject matter of Example 9 includes, wherein the operations further comprise: analyzing a plurality of past communications between the first communication participant and other second communication participants; determining that a second conversational triggering condition occurs in the plurality of past communications at a rate that is above a threshold, wherein the second conversational triggering condition is specific to an inactive communication support assistant of the plurality of available communication support assistants; and providing a suggestion, in a graphical user interface, that the first communication participant activate the inactive communication support assistant.

In Example 11, the subject matter of Example 10 includes, wherein the operations of determining that the second conversational triggering condition occurs in the plurality of past communications comprises determining, via a machine-learned discriminator model, that the second conversational triggering condition specific to an inactive communication support assistant of the plurality of available communication support assistants occurs in the plurality of past communications at the rate that is above the threshold.

In Example 12, the subject matter of Example 11 includes, wherein the operations further comprise: receiving an indication that a new communication support assistant is available, the new communication support assistant trained to detect a third conversational triggering condition; identifying training data comprising second plurality of past communications labeled with indications of whether the third conversational triggering condition detected by the new communication support assistant is present in the second plurality of past communications; updating the machine-learned discriminator model using the identified training data; analyzing a third plurality of past communications between the first communication participant and other second communication participants; determining that the third conversational triggering condition is detected by the new communication support assistant occurs in the third plurality of past communications at a rate that is above a second threshold; and providing a second suggestion, in a second graphical user interface, that the first communication participant activate the new communication support assistant.

In Example 13, the subject matter of Examples 10-12 includes, wherein the operations further comprise: receiving an indication that the first communication participant wishes to activate the inactive communication support assistant; and responsive to receiving the indication, installing the inactive communication support assistant.

In Example 14, the subject matter of Examples 9-13 includes, wherein the operations further comprise: receiving a second communication from a second communication participant to the first communication participant; identifying the plurality of activated communication support assistants that are activated for the first communication participant; identifying, using a second one of the plurality of activated communication support assistants, that a second triggering condition is present in the second communication; determining, using the at least one of the plurality of activated communication support assistants, at least one corrective action, the corrective action including a referral to another agent; causing a graphical user interface to be displayed to the first communication participant, the graphical user interface including a selectable control; receiving an indication that the selectable control has been selected by the first communication participant; and responsive to receiving the indication that the selectable control has been selected, connecting the another agent into a communication conversation between the first communication participant and the second communication participant.

In Example 15, the subject matter of Example 14 includes, wherein the second triggering condition is an upsale opportunity.

In Example 16, the subject matter of Examples 9-15 includes, wherein the conversational triggering condition is language that is too formal.

Example 17 is a machine-readable medium, storing instructions, which when executed by a machine, cause the machine to perform operations comprising: receiving a communication from a first communication participant and to a second communication participant prior to a transmission of the communication to the second communication participant; identifying a plurality of activated communication support assistants that are activated for the first communication participant, the plurality of activated communication support assistants selected from a plurality of available communication support assistants; identifying, using at least one of the plurality of activated communication support assistants, that a conversational triggering condition is present in the communication, each one of the plurality of available communication support assistants trained to detect a different conversational triggering condition; determining, using the at least one of the plurality of activated communication support assistants, at least one corrective action, the corrective action including a change to a content of the communication; causing a graphical user interface to be displayed to the first communication participant, the graphical user interface including a selectable control; receiving an indication that the selectable control has been selected by the first communication participant; responsive to receiving the indication that the selectable control has been selected, modifying the communication in accordance with the corrective action; and transmitting the communication to the second communication participant.

In Example 18, the subject matter of Example 17 includes, wherein the operations further comprise: analyzing a plurality of past communications between the first communication participant and other second communication participants; determining that a second conversational triggering condition occurs in the plurality of past communications at a rate that is above a threshold, wherein the second conversational triggering condition is specific to an inactive communication support assistant of the plurality of available communication support assistants; and providing a suggestion, in a graphical user interface, that the first communication participant activate the inactive communication support assistant.

In Example 19, the subject matter of Example 18 includes, wherein the operations of determining that the second conversational triggering condition occurs in the plurality of past communications comprises determining, via a machine-learned discriminator model, that the second conversational triggering condition specific to an inactive communication support assistant of the plurality of available communication support assistants occurs in the plurality of past communications at the rate that is above the threshold.

In Example 20, the subject matter of Example 19 includes, wherein the operations further comprise: receiving an indication that a new communication support assistant is available, the new communication support assistant trained to detect a third conversational triggering condition; identifying training data comprising second plurality of past communications labeled with indications of whether the third conversational triggering condition detected by the new communication support assistant is present in the second plurality of past communications; updating the machine-learned discriminator model using the identified training data; analyzing a third plurality of past communications between the first communication participant and other second communication participants; determining that the third conversational triggering condition is detected by the new communication support assistant occurs in the third plurality of past communications at a rate that is above a second threshold; and providing a second suggestion, in a second graphical user interface, that the first communication participant activate the new communication support assistant.

In Example 21, the subject matter of Examples 18-20 includes, wherein the operations further comprise: receiving an indication that the first communication participant wishes to activate the inactive communication support assistant; and responsive to receiving the indication, installing the inactive communication support assistant.

In Example 22, the subject matter of Examples 17-21 includes, wherein the operations further comprise: receiving a second communication from a second communication participant to the first communication participant; identifying the plurality of activated communication support assistants that are activated for the first communication participant; identifying, using a second one of the plurality of activated communication support assistants, that a second triggering condition is present in the second communication; determining, using the at least one of the plurality of activated communication support assistants, at least one corrective action, the corrective action including a referral to another agent; causing a graphical user interface to be displayed to the first communication participant, the graphical user interface including a selectable control; receiving an indication that the selectable control has been selected by the first communication participant; and responsive to receiving the indication that the selectable control has been selected, connecting the another agent into a communication conversation between the first communication participant and the second communication participant.

In Example 23, the subject matter of Example 22 includes, wherein the second triggering condition is an upsale opportunity.

In Example 24, the subject matter of Examples 17-23 includes, wherein the conversational triggering condition is language that is too formal.

Example 25 is a computing device comprising: means for receiving a communication from a first communication participant and to a second communication participant prior to a transmission of the communication to the second communication participant; means for identifying a plurality of activated communication support assistants that are activated for the first communication participant, the plurality of activated communication support assistants selected from a plurality of available communication support assistants; means for identifying, using at least one of the plurality of activated communication support assistants, that a conversational triggering condition is present in the communication, each one of the plurality of available communication support assistants trained to detect a different conversational triggering condition; means for determining, using the at least one of the plurality of activated communication support assistants, at least one corrective action, the corrective action including a change to a content of the communication; means for causing a graphical user interface to be displayed to the first communication participant, the graphical user interface including a selectable control; means for receiving an indication that the selectable control has been selected by the first communication participant; means for responsive to receiving the indication that the selectable control has been selected, modifying the communication in accordance with the corrective action; and means for transmitting the communication to the second communication participant.

In Example 26, the subject matter of Example 25 includes, means for analyzing a plurality of past communications between the first communication participant and other second communication participants; means for determining that a second conversational triggering condition occurs in the plurality of past communications at a rate that is above a threshold, wherein the second conversational triggering condition is specific to an inactive communication support assistant of the plurality of available communication support assistants; and means for providing a suggestion, in a graphical user interface, that the first communication participant activate the inactive communication support assistant.

In Example 27, the subject matter of Example 26 includes, wherein the means for determining that the second conversational triggering condition occurs in the plurality of past communications comprises means for determining, via a machine-learned discriminator model, that the second conversational triggering condition specific to an inactive communication support assistant of the plurality of available communication support assistants occurs in the plurality of past communications at the rate that is above the threshold.

In Example 28, the subject matter of Example 27 includes, means for receiving an indication that a new communication support assistant is available, the new communication support assistant trained to detect a third conversational triggering condition; means for identifying training data comprising second plurality of past communications labeled with indications of whether the third conversational triggering condition detected by the new communication support assistant is present in the second plurality of past communications; means for updating the machine-learned discriminator model using the identified training data; means for analyzing a third plurality of past communications between the first communication participant and other second communication participants; means for determining that the third conversational triggering condition is detected by the new communication support assistant occurs in the third plurality of past communications at a rate that is above a second threshold; and means for providing a second suggestion, in a second graphical user interface, that the first communication participant activate the new communication support assistant.

In Example 29, the subject matter of Examples 26-28 includes, means for receiving an indication that the first communication participant wishes to activate the inactive communication support assistant; and means for responsive to receiving the indication, installing the inactive communication support assistant.

In Example 30, the subject matter of Examples 25-29 includes, means for receiving a second communication from a second communication participant to the first communication participant; means for identifying the plurality of activated communication support assistants that are activated for the first communication participant; means for identifying, using a second one of the plurality of activated communication support assistants, that a second triggering condition is present in the second communication; means for determining, using the at least one of the plurality of activated communication support assistants, at least one corrective action, the corrective action including a referral to another agent; means for causing a graphical user interface to be displayed to the first communication participant, the graphical user interface including a selectable control; means for receiving an indication that the selectable control has been selected by the first communication participant; and means for responsive to receiving the indication that the selectable control has been selected, connecting the another agent into a communication conversation between the first communication participant and the second communication participant.

In Example 31, the subject matter of Example 30 includes, wherein the second triggering condition is an upsale opportunity.

In Example 32, the subject matter of Examples 25-31 includes, wherein the conversational triggering condition is language that is too formal.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

What is claimed is:

1. A computer-implemented communication support method, the method comprising:
   receiving a communication from a first communication participant and to a second communication participant prior to a transmission of the communication to the second communication participant;
   identifying a plurality of activated communication support assistants that are activated for the first communication participant, the plurality of activated communication support assistants selected from a plurality of available communication support assistants;
   identifying, using at least one of the plurality of activated communication support assistants, that a conversational triggering condition is present in the communication, each one of the plurality of available communication support assistants trained to detect a different conversational triggering condition;
   determining, using the at least one of the plurality of activated communication support assistants, at least one corrective action, the corrective action including a change to a content of the communication;
   causing a graphical user interface to be displayed to the first communication participant, the graphical user interface including a selectable control;
   receiving an indication that the selectable control has been selected by the first communication participant;
   responsive to receiving the indication that the selectable control has been selected, modifying the communication in accordance with the corrective action;
   transmitting the communication to the second communication participant;
   analyzing a plurality of past communications between the first communication participant and other second communication participants;
   determining that a second conversational triggering condition occurs in the plurality of past communications at a rate that is above a threshold, wherein the second conversational triggering condition is specific to an inactive communication support assistant of the plurality of available communication support assistants; and
   providing a suggestion, in a second graphical user interface, that the first communication participant activate the inactive communication support assistant.

2. The computer-implemented communication support method of claim 1, wherein the determining that the second conversational triggering condition occurs in the plurality of past communications comprises determining, via a machine-learned discriminator model, that the second conversational triggering condition specific to an inactive communication support assistant of the plurality of available communication support assistants occurs in the plurality of past communications at the rate that is above the threshold.

3. The computer-implemented communication support method of claim 2, further comprising:
receiving an indication that a new communication support assistant is available, the new communication support assistant trained to detect a third conversational triggering condition;
identifying training data comprising second plurality of past communications labeled with indications of whether the third conversational triggering condition detected by the new communication support assistant is present in the second plurality of past communications;
updating the machine-learned discriminator model using the identified training data;
analyzing a third plurality of past communications between the first communication participant and other second communication participants;
determining that the third conversational triggering condition is detected by the new communication support assistant occurs in the third plurality of past communications at a rate that is above a second threshold; and
providing a second suggestion, in a third graphical user interface, that the first communication participant activate the new communication support assistant.

4. The computer-implemented communication support method of claim 1, further comprising:
receiving an indication that the first communication participant wishes to activate the inactive communication support assistant; and
responsive to receiving the indication, installing the inactive communication support assistant.

5. The computer-implemented communication support method of claim 1, further comprising:
receiving a second communication from a second communication participant to the first communication participant;
identifying the plurality of activated communication support assistants that are activated for the first communication participant;
identifying, using a second one of the plurality of activated communication support assistants, that a second triggering condition is present in the second communication;
determining, using the at least one of the plurality of activated communication support assistants, at least one corrective action, the corrective action including a referral to another agent;
causing a graphical user interface to be displayed to the first communication participant, the graphical user interface including a selectable control;
receiving an indication that the selectable control has been selected by the first communication participant; and
responsive to receiving the indication that the selectable control has been selected, connecting the another agent into a communication conversation between the first communication participant and the second communication participant.

6. The computer-implemented communication support method of claim 5, wherein the second triggering condition is an upsale opportunity.

7. The computer-implemented communication support method of claim 1, wherein the conversational triggering condition is language that is too formal.

8. A computing device comprising:
a processor;
a memory, comprising instructions, which when executed by the processor, cause the processor to perform operations comprising:
receiving a communication from a first communication participant and to a second communication participant prior to a transmission of the communication to the second communication participant;
identifying a plurality of activated communication support assistants that are activated for the first communication participant, the plurality of activated communication support assistants selected from a plurality of available communication support assistants;
identifying, using at least one of the plurality of activated communication support assistants, that a conversational triggering condition is present in the communication, each one of the plurality of available communication support assistants trained to detect a different conversational triggering condition;
determining, using the at least one of the plurality of activated communication support assistants, at least one corrective action, the corrective action including a change to a content of the communication;
causing a graphical user interface to be displayed to the first communication participant, the graphical user interface including a selectable control;
receiving an indication that the selectable control has been selected by the first communication participant;
responsive to receiving the indication that the selectable control has been selected, modifying the communication in accordance with the corrective action;
transmitting the communication to the second communication participant;
analyzing a plurality of past communications between the first communication participant and other second communication participants;
determining that a second conversational triggering condition occurs in the plurality of past communications at a rate that is above a threshold, wherein the second conversational triggering condition is specific to an inactive communication support assistant of the plurality of available communication support assistants; and
providing a suggestion, in a second graphical user interface, that the first communication participant activate the inactive communication support assistant.

9. The computing device of claim 8, wherein the operations of determining that the second conversational triggering condition occurs in the plurality of past communications comprises determining, via a machine-learned discriminator model, that the second conversational triggering condition specific to an inactive communication support assistant of the plurality of available communication support assistants occurs in the plurality of past communications at the rate that is above the threshold.

10. The computing device of claim 9, wherein the operations further comprise:
receiving an indication that a new communication support assistant is available, the new communication support assistant trained to detect a third conversational triggering condition;
identifying training data comprising second plurality of past communications labeled with indications of whether the third conversational triggering condition detected by the new communication support assistant is present in the second plurality of past communications;

updating the machine-learned discriminator model using the identified training data;

analyzing a third plurality of past communications between the first communication participant and other second communication participants;

determining that the third conversational triggering condition is detected by the new communication support assistant occurs in the third plurality of past communications at a rate that is above a second threshold; and providing a second suggestion, in a third graphical user interface, that the first communication participant activate the new communication support assistant.

11. The computing device of claim 8, wherein the operations further comprise:

receiving an indication that the first communication participant wishes to activate the inactive communication support assistant; and responsive to receiving the indication, installing the inactive communication support assistant.

12. The computing device of claim 8, wherein the operations further comprise:

receiving a second communication from a second communication participant to the first communication participant;

identifying the plurality of activated communication support assistants that are activated for the first communication participant;

identifying, using a second one of the plurality of activated communication support assistants, that a second triggering condition is present in the second communication;

determining, using the at least one of the plurality of activated communication support assistants, at least one corrective action, the corrective action including a referral to another agent;

causing a graphical user interface to be displayed to the first communication participant, the graphical user interface including a selectable control;

receiving an indication that the selectable control has been selected by the first communication participant; and responsive to receiving the indication that the selectable control has been selected, connecting the another agent into a communication conversation between the first communication participant and the second communication participant.

13. The computing device of claim 12, wherein the second triggering condition is an upsale opportunity.

14. The computing device of claim 8, wherein the conversational triggering condition is language that is too formal.

15. A machine-readable medium, storing instructions, which when executed by a machine, cause the machine to perform operations comprising:

receiving a communication from a first communication participant and to a second communication participant prior to a transmission of the communication to the second communication participant;

identifying a plurality of activated communication support assistants that are activated for the first communication participant, the plurality of activated communication support assistants selected from a plurality of available communication support assistants;

identifying, using at least one of the plurality of activated communication support assistants, that a conversational triggering condition is present in the communication, each one of the plurality of available communication support assistants trained to detect a different conversational triggering condition;

determining, using the at least one of the plurality of activated communication support assistants, at least one corrective action, the corrective action including a change to a content of the communication;

causing a graphical user interface to be displayed to the first communication participant, the graphical user interface including a selectable control;

receiving an indication that the selectable control has been selected by the first communication participant;

responsive to receiving the indication that the selectable control has been selected, modifying the communication in accordance with the corrective action;

transmitting the communication to the second communication participant;

analyzing a plurality of past communications between the first communication participant and other second communication participants;

determining that a second conversational triggering condition occurs in the plurality of past communications at a rate that is above a threshold, wherein the second conversational triggering condition is specific to an inactive communication support assistant of the plurality of available communication support assistants; and providing a suggestion, in a second graphical user interface, that the first communication participant activate the inactive communication support assistant.

16. The machine-readable medium of claim 15, wherein the operations of determining that the second conversational triggering condition occurs in the plurality of past communications comprises determining, via a machine-learned discriminator model, that the second conversational triggering condition specific to an inactive communication support assistant of the plurality of available communication support assistants occurs in the plurality of past communications at the rate that is above the threshold.

17. The machine-readable medium of claim 16, wherein the operations further comprise:

receiving an indication that a new communication support assistant is available, the new communication support assistant trained to detect a third conversational triggering condition;

identifying training data comprising second plurality of past communications labeled with indications of whether the third conversational triggering condition detected by the new communication support assistant is present in the second plurality of past communications;

updating the machine-learned discriminator model using the identified training data;

analyzing a third plurality of past communications between the first communication participant and other second communication participants;

determining that the third conversational triggering condition is detected by the new communication support assistant occurs in the third plurality of past communications at a rate that is above a second threshold; and providing a second suggestion, in a third graphical user interface, that the first communication participant activate the new communication support assistant.

* * * * *